(12) United States Patent
Tassery et al.

(10) Patent No.: US 12,485,506 B2
(45) Date of Patent: Dec. 2, 2025

(54) METHOD FOR REPAIRING AN AIR INTAKE LIP (71) Applicant: SAFRAN NACELLES, Gonfreville-l'Orcher (FR)

(72) Inventors: Dylan Laurent Pascal Tassery, Moissy-Cramayel (FR); Nicolas Dezeustre, Moissy-Cramayel (FR)

(73) Assignee: SAFRAN NACELLES, Gonfreville l'Orcher (FR)

( * ) Notice: Subject to any disclaimer, the term of this patent is extended or adjusted under 35 U.S.C. 154(b) by 899 days.

(21) Appl. No.: 17/769,874

(22) PCT Filed: Oct. 15, 2020

(86) PCT No.: PCT/FR2020/051842
§ 371 (c)(1),
(2) Date: Apr. 18, 2022

(87) PCT Pub. No.: WO2021/074536
PCT Pub. Date: Apr. 22, 2021

(65) Prior Publication Data
US 2022/0371133 A1   Nov. 24, 2022

(30) Foreign Application Priority Data

Oct. 18, 2019   (FR) ...................................... 1911712

(51) Int. Cl.
*B23P 6/00*    (2006.01)
*B64F 5/40*    (2017.01)
(Continued)

(52) U.S. Cl.
CPC ................ *B23P 6/007* (2013.01); *B64F 5/40* (2017.01); *F01D 25/24* (2013.01); *F02C 7/04* (2013.01);
(Continued)

(58) Field of Classification Search
CPC .. B23P 6/007; B64F 5/40; F01D 25/24; F01D 5/005; F02C 7/04; B64D 2033/0273;
(Continued)

(56) References Cited

U.S. PATENT DOCUMENTS 6,171,704 B1 *   1/2001   Mosser .................. B64D 29/00
                                                          428/626
8,696,843 B1 *   4/2014   Dean ....................... B29C 73/10
                                                          428/116

(Continued)

FOREIGN PATENT DOCUMENTS

DE      4436186 A1 *   5/1995   ............... F01D 5/20
EP      0 781 861 A1       7/1997
(Continued)

OTHER PUBLICATIONS

International Search Report as issued in International Patent Application No. PCT/FR2020/051842, dated Jan. 27, 2021.

*Primary Examiner* — Ryan J. Walters
(74) *Attorney, Agent, or Firm* — Pillsbury Winthrop Shaw Pittman LLP (57) ABSTRACT

A method for repairing a turbomachine air intake lip including a damaged area whose shape differs from the initial shape of the lip, includes identifying the damage; depositing a filler material on the damaged area so as to give it a shape identical to the initial shape; inspecting the shape of the lip; and inspecting the performed repair.

9 Claims, 5 Drawing Sheets

(51) Int. Cl.
*F01D 25/24* (2006.01)
*F02C 7/04* (2006.01)
*B64D 33/02* (2006.01)
*F01D 5/00* (2006.01)

(52) U.S. Cl.
CPC ...... *B64D 2033/0273* (2013.01); *F01D 5/005* (2013.01); *F05D 2220/323* (2013.01); *F05D 2230/31* (2013.01); *F05D 2230/80* (2013.01)

(58) Field of Classification Search
CPC ............ B64D 2033/0286; B64D 33/02; F05D 2220/323; F05D 2230/31; F05D 2230/80; B29C 73/02
See application file for complete search history.

(56) References Cited

U.S. PATENT DOCUMENTS

| | | | | |
|---|---|---|---|---|
| 10,093,434 | B2* | 10/2018 | Matthews | ................ B23P 6/04 |
| 2009/0130327 | A1* | 5/2009 | Erdmanm | ................ C23C 24/04 |
| | | | | 427/457 |
| 2015/0063903 | A1* | 3/2015 | Matthews | ................ B22F 7/00 |
| | | | | 403/267 |
| 2018/0170568 | A1 | 6/2018 | Porte et al. | |

FOREIGN PATENT DOCUMENTS

| | | |
|---|---|---|
| EP | 1 962 562 A1 | 8/2008 |
| EP | 2 261 012 A1 | 12/2010 |
| WO | WO 2006/121511 A1 | 11/2006 |
| WO | WO 2013/142902 A2 | 10/2013 |

* cited by examiner

METHOD FOR REPAIRING AN AIR INTAKE LIP

CROSS-REFERENCE TO RELATED APPLICATIONS

This application is the U.S. National Stage of PCT/FR2020/051842, filed Oct. 15, 2020, which in turn claims priority to French patent application number 1911712 filed Oct. 18, 2019. The content of these applications are incorporated herein by reference in their entireties.

TECHNICAL FIELD

The present invention falls within the field of the repair of the air intake lips of turbomachines used in the aeronautical field.

PRIOR ART

The aeronautical field is related to many requirements, in particular in terms of repair certification. Thus, when a part is damaged, even locally, it is generally necessary to change it entirely. This method involves a particularly high cost for various reasons, the first one being the unavailability of the aircraft. Currently, when an air intake lip of a turbojet engine is damaged, only permanent repair solutions are envisaged, requiring the replacement of the entire lip or at least a large segment thereof. This operation requires a spare part and skilled labor, which is not always available at the stopping place. It is then necessary either to transport to the place where the aircraft is stopped the material and human resources necessary for the total repair of the damaged lip, or to disassemble the air intake lip and to transport it to the repair facility. Damage, even localized damage to an air intake lip can thus cause the aircraft to be stopped for a very long time.

It would therefore be particularly advantageous to have a temporary and local repair method, which can be easily implemented, in order to restore the aircraft, that is to say, to repair the damaged air intake lip locally.

DISCLOSURE OF THE INVENTION

The invention aims precisely to achieve this aim and relates to a method for repairing a turbomachine air intake lip comprising a damaged area whose shape differs from the initial shape of the lip, characterized in that it comprises:
 a step of identifying the damage;
 a step of depositing a filler material on the damaged area so as to give it a shape identical to the initial shape;
 a step of inspecting the shape of the lip;
 a step of inspecting the performed repair.

Such a method allows repairing an air intake lip of a turbojet engine temporarily. It allows the aircraft to reach a maintenance center or to continue to operate while waiting to schedule a permanent repair of the damaged part and thus reduce the duration of unavailability of the aircraft due to localized damage to the air intake lip.

It also avoids having to change the entire air intake lip and thus avoids storing spare parts in all the places where the aircraft could break down, since such a repair method allows the aircraft to reach a place of maintenance to undergo a permanent repair.

The proposed repair method aims more specifically to repair a stamped area of the air intake lip of a turbojet engine. By "stamped area" it is understood that the air intake lip has suffered damage which has deformed its outer surface so that the outer surface of the damaged area has moved towards the body of the turbomachine compared to the initial profile of the turbomachine lip before damage.

For example, the initial shape, also called initial profile, of the lip can have the aerodynamic shape called "curved profile". In one embodiment, the filler material is a resin chosen from the epoxy resins.

In another embodiment, the filler material can be a metal, for example aluminum.

Preferably, the metal chosen is an alloy identical to that of the air intake lip. However, the filler material does not have to be the same metal as the lip.

In one embodiment, the deposition of the filler material can be done by a cold spraying means or a thermal spraying means. For example, ColdSpray or HotSpray methods by plasma spraying, high-speed flame spraying, flame spraying, electric arc spraying or detonation spraying. These embodiments are particularly preferred when the filler material is a metal.

For example, the filler material can be deposited by high-speed powder spraying.

In one embodiment, the filler material can be deposited with a spatula. This embodiment is particularly preferred when the filler material is a resin.

It is sometimes observed in a stamped area or at the periphery of the latter a displacement of material from the body of the turbomachine outwards creating blisters. In one embodiment, the repair method further comprises, before the step of depositing a filler material, a step of hammering the contours of the damaged area.

Such a step ensures that the deposition of the filler material restores the initial profile of the air intake lip.

In one embodiment, a step of preparing the damaged area can be carried out before the step of depositing a filler material.

For example, such a step can comprise the implementation of the precautions necessary to carry out the subsequent step of depositing the filler material.

Such a step of preparing the damaged area can comprise the cleaning of the area, the protection of the area surrounding the area to be repaired or the filling of the through cracks present in the damaged area, identified in the step of identifying the damage. Indeed, cracks or holes through the entire air intake lip in a stamped area are sometimes observed. In this case, it is necessary to fill the crack or the hole before the step of depositing a filler material to make sure that the filler material can be deposited on the stamped area and does not serve for the covering of the crack, which would leave an undesirable underlying hole, or more simply does not escape through a through hole or even obstructs the de-icing system present in the air intake lip.

Thus, in one embodiment, the step of preparing the area to be repaired can comprise the injection of a material for filling the through cracks or holes before the step of depositing the filler material.

In one embodiment, the filling material is chosen from mastic, preferably one- or two-component silicone-based mastic, or a resin, for example an epoxy resin or a bismaleimide resin (known as "BMI" resin).

In one embodiment, the filling material can be deposited with a spatula.

Preferably, the filling material is a fugitive material, that is to say it is eliminated when the temperature is high. Particularly, it is possible to eliminate the fugitive material by activating the de-icing system present in the cavity of the air intake lip, and the fugitive material is then eliminated by the exhaust of the de-icing system.

In one embodiment, after deposition of the filler material on the damaged portion, one or more step(s) of inspecting the shape of the air intake lip is/are carried out.

The aim of such an inspection step is to ensure that the repair has effectively restored the initial profile of the air intake lip and thus ensure that the aircraft is ready to leave.

Such an inspection can be carried out using a template, or using a comparison between a 3D scan of the repaired lip and a digital model of the air intake lip.

In one embodiment, the method further comprises, after deposition of the filler material, or where appropriate after the inspection steps, a step of protecting the damaged area of the air intake lip.

For example, such a protection step can be the deposition of an anti-corrosion layer above the repaired area in order to improve its resistance to the environments encountered in flight.

For example, the deposition of an anti-corrosion layer can be made by chromating of the surface.

DESCRIPTION OF THE EMBODIMENTS

The invention will now be described by means of illustrative figures which should not be construed as limiting the invention.

Figure 1:
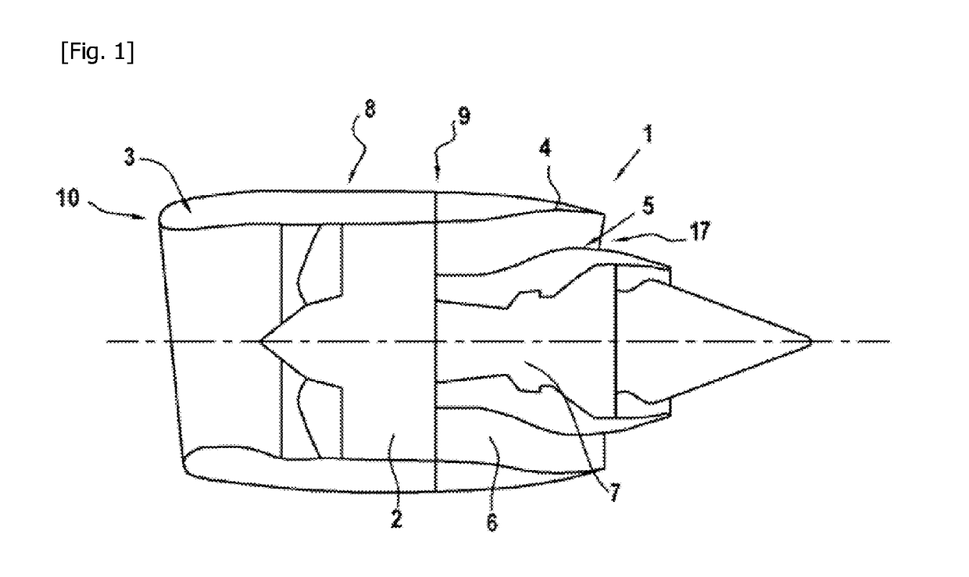
FIG. 1 is a representation of a turbomachine.

FIG. 1 is a longitudinal sectional view of an aircraft propulsion assembly 1, including at least one turbojet engine 2 housed in a nacelle 3. The nacelle 3 has a substantially tubular structure comprising an air intake lip 10 upstream of the turbojet engine 2, an intermediate assembly 8, also called fan cowl, intended to surround a fan of the turbojet engine and a rear assembly 9 which can integrate thrust reversal means and intended to channel the secondary stream or to attenuate the acoustic emissions of the assembly. The nacelle 3 is terminated by an ejection nozzle 17 whose outlet is located downstream of the turbojet engine 2. The nacelle 3 comprises an Outer Fixed Structure 4 (or OFS) and an Inner Fixed Structure 5 (or IFS). The structure 4 can, in one alternative that is not shown, be mobile, and it is then called transcowl. These two structures 4 and 5 are concentric and define an annular flowpath 6 in which the secondary stream is intended to circulate when the turbojet engine 2 is in operation. The Inner Fixed Structure 5 constitutes the outer shell of the engine compartment 7 of the turbojet engine 2.

Figure 2:
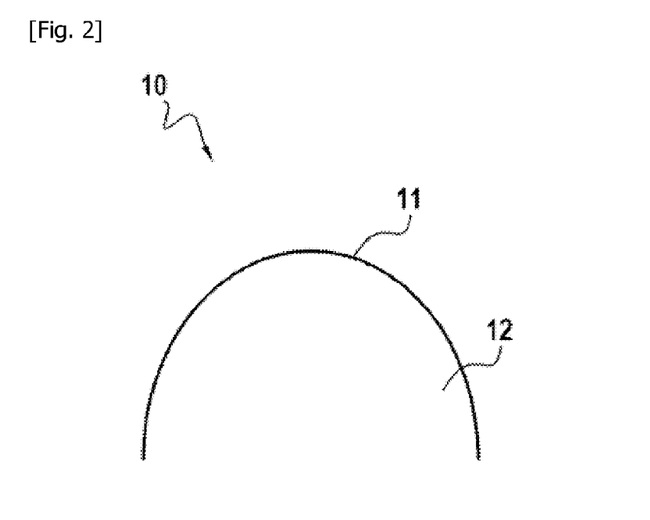
FIG. 2 is a representation of an air intake lip.

FIG. 2 represents a close-up view of the air intake lip 10, comprising a body 12 defining an initial profile 11.

Figure 3:
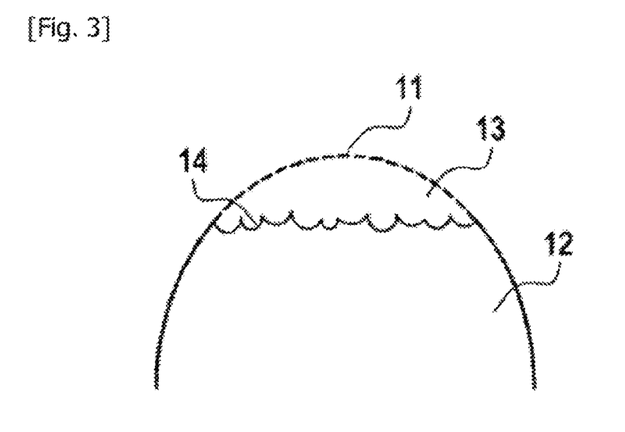
FIG. 3 is a representation of an air intake lip according to FIG. 2 which has suffered damage.

FIG. 3 represents the air intake lip according to FIG. 2, whose end is bumpy. A portion 13 of the body 12 of the lip has been stamped, for example following an impact, and the surface of the stamped area 14 no longer corresponds to the initial profile 11.

In order to restore the initial profile 11, for restoring the aerodynamics of the lip in particular, a filler material is deposited.

This deposition allows creating an area 15 of filler material that allows restoring the surface of the lip to its initial profile 11.

Of course, the filler material can be chosen according to its compatibility with the constituent material of the air intake lip 10 to be repaired.

Particularly, a material which is easy to spray, which has a thermal conduction close to that of the lip to be repaired and which resists the pressures applied to the lip in operation, can be chosen.

It is possible to proceed, before the step of depositing the filler material, to a step of determining the filler material to be used. Such a step can comprise, where appropriate, the determination of the composition of the damaged air intake lip.

Figure 4:
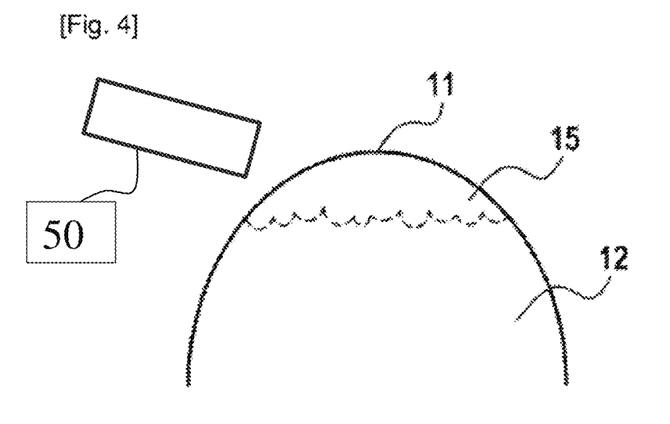
FIG. 4 is a representation of an air intake lip after a method according to one embodiment of the invention.

FIG. 4 represents an air intake lip 10 repaired by the deposition of a filler material 15 so that the profile obtained after the deposition is identical to the initial profile 11.

Figure 5:
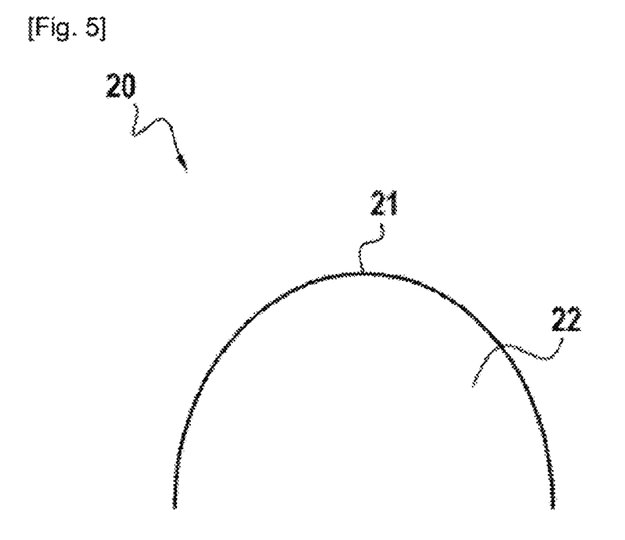
FIG. 5 is a representation of an air intake lip.
Figure 6:
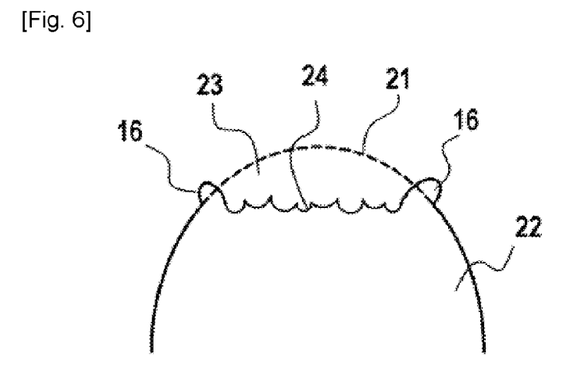
FIG. 6 is a representation of an air intake lip according to FIG. 5 having suffered damage and having blisters.
Figure 7:
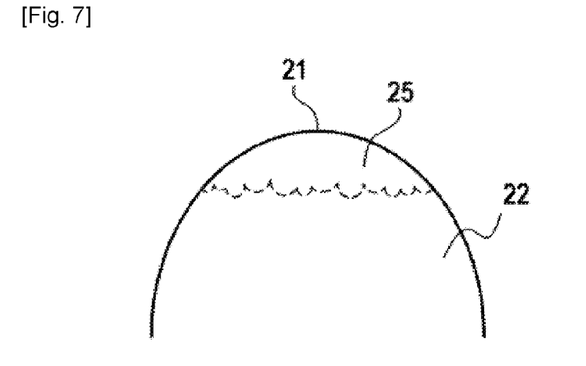
FIG. 7 is a representation of an air intake lip after a method according to one embodiment of the invention.

A second embodiment is represented in FIGS. 5 to 7.

FIG. 5 schematically represents an air intake lip 20, whose body 22 defines an initial profile 21.

FIG. 6 represents the air intake lip according to FIG. 5 with a bumpy end which has a stamped surface whose profile 24 differs from the initial profile 21. In addition, the intake lip has blisters 16 on the contour of the stamped area 24 which protrudes outwardly of the body 22 of the lip relative to the initial profile 21.

The blisters 16 correspond to portions of the initial body 22 of the lip protruding beyond the initial profile 21 of the lip, that is to say outwardly from the body 22 of the air intake lip, unlike a stamped area as defined previously.

In such a case, a first step of reshaping the damaged lip is carried out. In such a reshaping step, the blisters are hammered, if necessary hot-hammered, to bring them back into the internal portion 22 of the initial profile 21 of the lip. The subsequent step of depositing a filler material thus allows filling the free space 23 between the stamped area 24 and the initial profile 21, without leaving blisters.

FIG. 7 represents an air intake lip such as that of FIG. 6 after a method according to one embodiment comprising a step of hammering the blisters 16 and a step of depositing a filler material 25 on the stamped area having allowed restoring the initial profile 21 of the air intake lip.

A third embodiment is represented in FIGS. 8 to 11.

Figure 8:
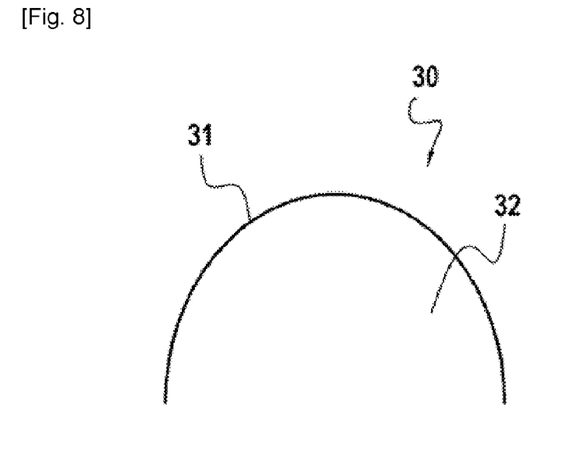
FIG. 8 is a representation of an air intake lip.

FIG. 8 schematically represents an air intake lip 30, whose body 32 defines an initial profile 31.

Figure 9:
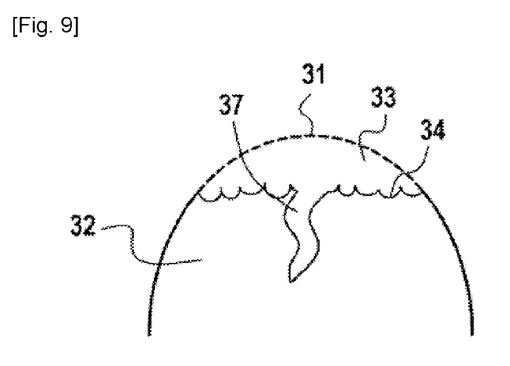
FIG. 9 is a representation of an air intake lip according to FIG. 8 having suffered damage and having a crack.

FIG. 9 represents the air intake lip according to FIG. 8 having a stamped surface whose profile 34 differs from the initial profile 31 due to a material defect in the area 33. The air intake lip further has a crack 37 starting from the stamped area 34 inwardly of the body 32 of the lip.

Figure 10:
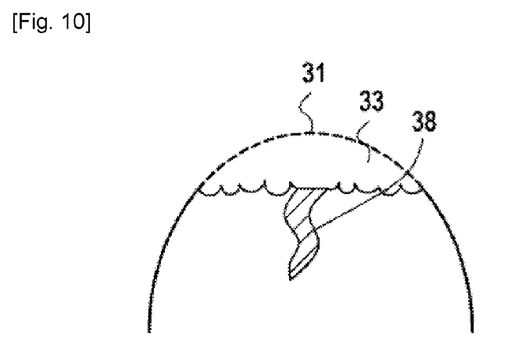
FIG. 10 is a representation of an air intake lip after a sealing step according to one embodiment of the invention.

In order to limit the amount of filler material to be deposited and to ensure that the deposition of the filler material does not pass through the lip, nor clog the de-icing system present in the air intake lip, the crack 37 can be previously filled with a filling material 38 as illustrated in FIG. 10.

Preferably, the crack is only filled if it is a through crack that is to say if it allows a passage between the exterior and the inner cavity of the air intake lip.

Such a filling material can be chosen from mastics or resins. Of course, such a filling material must be resistant to the conditions imposed for the subsequent deposition of the filler material. Such material can be applied by any method, and preferably with a spatula.

As specified above, the filling material can be a fugitive material. In this case, the fugitive material can be removed after the deposition of the filler material. For example, the activation of the de-icing system allows melting the filling material and thus eliminating it via the exhaust circuit of the de-icing system.

Once the crack 37 has been filled with the filling material 38, and as shown in FIG. 10, the deposition of a filler material in the region 33 between the stamped area 34 and the initial profile 31 allows restoring the shape of the lip.

Figure 11:
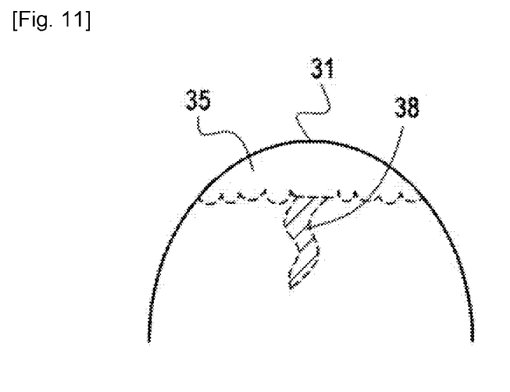
FIG. 11 is a representation of an air intake lip after a method according to one embodiment of the invention.

FIG. 11 shows an air intake lip 30 thus repaired whose initial profile 31 is restored by the deposition of filler material 38 and the deposition of filler material 35.

As specified above, the embodiments presented in FIGS. 2 to 11 represent only possibilities of implementation of a method of the invention and should not be construed exhaustively. It is possible to combine some embodiments, particularly a method is envisaged comprising a step of partially straightening the lip as envisaged in relation to FIG. 6, and also comprising a step of sealing a crack as described in relation to FIGS. 9 and 10. In addition, a method according to the invention also allows repairing an air intake lip having a through hole, by one embodiment similar to the one described in relation to FIGS. 8 to 11.

Figure 12:
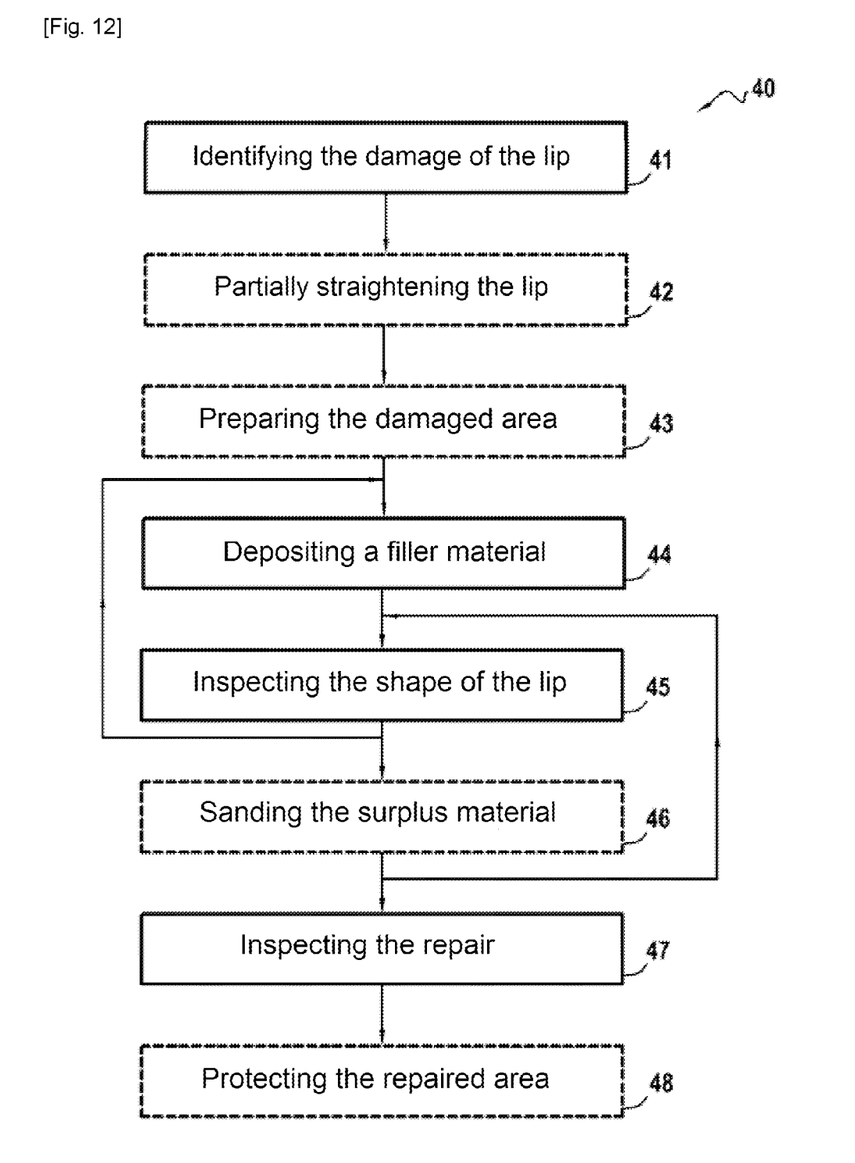
FIG. 12 is a flowchart representing the optional or essential steps of a method according to the invention.

FIG. 12 represents a flowchart of the optional or essential steps of a method 40 according to the invention. The optional steps are represented by dotted boxes.

Particularly, a first step 41 of identifying the damage to the air intake lip is described.

Such a step 41 of identifying the damage comprises any action that allows knowing which steps must be undertaken to carry out the repair of the air intake lip, and any action that allows guiding the choice of the filler material and, where appropriate, the filling material.

For example, such a step can comprise the determination of the material making up the air intake lip, in order to guide the choice of the filler material. Such a step can also comprise the detection of the presence or absence of cracks at the damage area. In the case where cracks are actually detected, such an identification step 41 can further comprise a step of characterizing the cracks to know whether they are through cracks or not. Such a step can also comprise checking whether or not there are any blisters around the damaged area. In one embodiment, the damage identification step 41 also comprises the determination of the depth of the damage to the area to be repaired. This depth can have an importance on the choice of the filler material. For example, it may be chosen to deposit a resin if the profile of the damaged area does not differ from the initial profile of more than 5 mm, and from a metal in the case where the profile of the damaged area differs from the initial profile of more than 5 mm.

In the case where blisters as described above are present, a method according to the invention comprises a step 42 of partially straightening the air intake lip.

Particularly, such a step can be carried out by hammering of the blister, optionally by heating of said blister. Preferably, the heating is carried out at a temperature less than or equal to the temperature that the material reaches when the de-icing system is activated, for example less than 300° C. in order to locally improve the malleability of the lip and thus to carry out a more effective straightening.

In one embodiment, a step 43 of preparing the damaged area can be carried out.

Such a step can include the implementation of all the necessary precautions for the successful achievement of the subsequent step of depositing the filler material. For example, such a step can comprise a step of cleaning the area to be repaired.

Such cleaning allows avoiding the presence of bodies or dust between the air intake lip and the filler material, which could affect the quality of the deposition.

The step 43 of preparing the area to be repaired can also comprise a step of protecting the areas surrounding the damaged area. Such protection can for example be achieved by placing tarpaulins or masks over the surrounding area to prevent any unwanted deposition of the filler material.

Particularly, such a step allows preventing the dust that will be possibly generated during the deposition step from penetrating into other parts of the aircraft whose air lip is repaired.

Such a step can further include, in the case where cracks are present, a step of sealing the cracks with a filling material. During this step, each of the cracks present in the stamped area can be filled with a filling material, with the aim of preventing the cracks from causing too great a need for filler material or a leak of the filler material inside the lip. In the case where the damage identification step 41 allowed determining that the cracks are not through cracks, it is not necessary to seal the cracks. In the case of a through crack, the filling of the cracks during the step of preparing the area to be repaired 43 allows avoiding leakage of the filler material inside the lip and thus allows preventing the filler material from compromising the efficiency of the de-icing system. The filling material has sufficient viscosity and adhesion to the walls of the crack to seal them without completely flowing therethrough.

The step of preparing the damaged area is not limited by the number or by the order in which the steps that may constitute it have been presented here. Particularly, the cleaning of the area to be repaired can be carried out before or after the sealing of the cracks and the protection of the surrounding area can also be carried out before or after the step of sealing the cracks. There may also be several cleaning or protection steps.

Following step 41, and where appropriate steps 42 and 43, a method of the invention comprises a step 44 of depositing a filler material. Such a step allows restoring the profile of the air intake lip in a sufficiently durable manner to allow the aircraft to which the turbomachine is attached to leave its place of repair. This step allows having a method offering a temporary repair, easy to apply and without the need to change the entire air intake lip.

The step of depositing the filler material is followed by a step 45 of inspecting the shape of the lip. Such a step allows ensuring that the deposition of the filler material carried out in step 44 effectively allows restoring the profile of the air intake lip.

For example, the step of inspecting the shape of the lip can be carried out using a template that is to say a shape complementary to the initial profile of the lip that has just been affixed against the repair carried out to ensure that its profile is compliant, or by the comparison a 3D scan of the lip after repair and of the digital model of the initial profile of the lip.

If the inspection step 45 concludes that too little filler material has been sprayed, then a filler material deposition step 44 can be carried out again.

If, on the contrary, the inspection step 45 concludes that too much filler material has been sprayed, a step of sanding 46 the surplus material can be carried out, with the aim of restoring the initial profile of the air intake lip.

In the case where a sanding step 46 is present, it can be followed again by a step of inspecting 45 the shape of the air intake lip.

Once the profile of the lip has been restored by the filler material deposition step 44 and the shape of the lip inspected by step 45, a repair inspection step 47 is performed. This step allows detecting a possible leak between the inner portion of the body of the lip (12, 22, 32) and the outer portion of the lip (15, 25, 35) comprising the filler material deposited in step 44. Particularly, it is essential to ensure that the operation of the de-icing system has not been affected by the repair.

Such an inspection can for example be a dye penetrant inspection, making it possible to detect any cracks.

For example, a step of inspecting the repair 47 can be carried out by activating the de-icing system, then by inspecting whether any leaks are observed at the repaired area.

In another embodiment, the step of inspecting the repair can be carried out by introduction of compressed air into the lip through the exhaust of the lip, through which the stream coming from the de-icing system is expelled, then by inspecting whether leaks are observed at the repaired area.

In addition, the step 47 of inspecting the repair comprises a step of measuring the electrical conductivity of the air intake lip. Indeed, in case of lightning, it is important to make sure that the repair has not created any resistance. For example, the inspection of the electrical conductivity of the air intake lip can be made with a multimeter.

Finally, in one embodiment, a method 40 further comprises a step 48 of protecting the repaired area. Step 48 can be carried out by the deposition of an anti-corrosion layer. For example, such a step of protecting the repaired area can be carried out by chromating of the repaired area. For example, such chromating can be done with a brush or a rag.

Particularly, such a step is particularly preferred when the filler material is a metal material.

A method 40 as described in FIG. 12 allows carrying out the temporary repair of an intake lip so that the latter regains a profile identical to the initial profile. Such a method is less difficult to implement than a method of the prior art and does not require a complete change of the lip unlike a method of the prior art.

The invention claimed is:

1. A method for repairing a turbomachine air intake lip comprising a stamped area having suffered damage which has deformed the outer surface of said intake lip so that the outer surface of the stamped area has moved towards the body of the turbomachine compared to the initial profile of the turbomachine lip before stamping, the method comprising:
    identifying the stamped area;
    depositing a filler material on the stamped area so as to give it a shape identical to the initial shape;
    inspecting the shape of the lip, and
    inspecting the performed repair,
    the depositing of the filler material being made by carrying out a cold spraying or a thermal spraying process.

2. The repair method according to claim 1, further comprising, before the depositing of the filler material, hammering contours of the damaged area.

3. The repair method according to claim 1, further comprising, before depositing of the filler material, preparing the damaged area.

4. The repair method according to claim 3, wherein preparing the damaged area comprises the injection of a filling material into a through crack or hole present in the damaged area.

5. The repair method according to claim 1, further comprising, after inspecting the performed repair, protecting the damaged area of the air intake lip.

6. The repair method according to claim 1, wherein the filler material is a metal or a resin.

7. The repair method according to claim 1, wherein the filler material is deposited by high-speed powder spraying.

8. The repair method according to claim 1, wherein the shape of the lip is inspected by comparing a 3D scan of the repaired area to a digital model of the air intake lip.

9. The repair method according to claim 1, wherein inspecting the performed repair comprises activating a de-icing system of the turbomachine.

* * * * *